United States Patent Office 2,999,814
Patented Sept. 12, 1961

2,999,814
CUTTING FLUID
Ernst Laug, Union City, N.J., assignor to Socony Mobil Oil Company Inc., a corporation of New York
No Drawing. Filed Apr. 4, 1958, Ser. No. 726,335
11 Claims. (Cl. 252—34.7)

This invention has to do with an aqueous composition adapted, particularly in diluted form, for use as a coolant and lubricating agent in metal cutting, metal grinding and similar operations.

In the machining of metals in operations such as cutting, threading, tapping, and the like it is customary to flood the tool and work with a coolant to carry away heat from the tool and work, and normally such coolants are also so compounded as to lubricate the operation. Due to the high unit pressures involved, particularly in high speed operations, the fluid, if used also as a lubricant, must be an exceptionally capable coolant. Many such fluids are emulsified petroleum oil base fluids, although in some cases it would appear that non-petroleum base fluids are more acceptable.

In Patent No. 2,625,509, issued January 13, 1953, I described a non-petroleum base lubricant which represents a considerable improvement over prior compositions. However, while the lubricant is advantageous in that it is stable, non-corrosive and rust-inhibiting, it has been found to have certain undesirable features. For example, it is subject to general complaints of: excessive foam formation, formation of insoluble soaps, and irritation to the nose and throat of a machine tool operator working with the lubricant.

It is an object of this invention to provide an aqueous composition of the class described, which is effective as a coolant and lubricant and which is free from the undesirable features recited above.

Another object of the invention is to provide a stable, non-corrosive, rust-inhibiting coolant-lubricant.

Another object is the provision of a coolant-lubricant forming a soft, residual film on metal surfaces, which film is easily removed therefrom by water-washing.

Still another object is the provision of a coolant-lubricant adaptable for use with hard water with a minimum formation of insoluble soaps.

Still other objects will be apparent from the following detailed description of the invention.

The foregoing objects are realized with aqueous compositions containing balanced proportions of certain olefin oxide-aqueous saturated polyol reaction products in combination with mixed soaps of alkanolamine fatty acids, an alkanolamine phosphate, a rust inhibitor and a germicide.

As indicated, one component of the new compositions is a reaction product of an olefin oxide and a water solution of a saturated polyol. The olefin oxide is of low molecular weight, and is preferably ethylene oxide. Saturated polyols contemplated herein contain at least three hydroxyl groups, from three to six carbon atoms per molecule, and only carbon, hydrogen and oxygen. Particularly preferred of such polyols is sorbitol. In forming the reaction products, water is present in the proportion of from 0.08 to 1.5 mols per mol of hydroxyl radical in the polyol, and the olefin oxide is employed in a molal quantity of at least 0.4 times the total molal quantity of hydroxyl in the polyol plus water and of at least 1.5 times the molal quantity of water. The reaction may be conveniently carried out between about 80° C. and about 140° C. in the presence of an etherification catalyst. Further details for the preparation of such reaction products are given in Brown Patent No. 2,450,079.

A particularly effective reaction product is readily formed by reacting about 5 parts by weight of ethylene oxide with 1 part by weight of 85 percent aqueous sorbitol solution, under alkaline conditions and at temperatures between about 80° C. and about 140° C. The reaction product so formed is a water-soluble, mixed oxyethylene ether of sorbitol and ethylene glycol. It is an amber colored liquid insoluble in mineral oil and has a specific gravity at 25° C. of about 1.16. Its viscosity at that temperature is about 450 centipoises, and it has a hydroxyl number in the neighborhood of 400. This reaction product is identified hereinafter as "Reaction Product A."

Another component of the new compositions comprises alkanolamine soaps of certain fatty acids. The alkanolamines used in forming such soaps are of low molecular weight such as diethanolamine, triethanolamine and the like; and, of these, triethanolamine is preferred. The fatty acids used in forming the soaps include castor oil fatty acids, wool grease fatty acids, ricinoleic acid, and oleic acid. Castor oil fatty acids are particularly preferred herein. It is to be understood that the soaps can be replaced in these compositions by using comparable quantities of the corresponding alkanolamine or alkanolamines and acid or acids.

Castor oil fatty acids are generally characterized by the following specifications:

Acid number_____ 165–185
Saponification number_____ 185–195
Iodine number_____ 85–95

Typical wool grease fatty acids are illustrated below in the following tabulations:

PHYSICAL CHARACTERISTICS OF WOOL GREASE FATTY ACIDS, PRODUCED IN THE UNITED KINGDOM

| | Range | Typical |
|---|---|---|
| Moisture, percent | 1–5 | 2 |
| Unsaponifiable, percent | 3–7 | 5 |
| Saponifiable, percent | 70–98 | 95 |
| Free fatty acids, as oleic, percent | 70–95 | 84 |
| Free neutral fat, percent | 0–5 | None |
| Saponification value | 120–190 | 170 |
| Iodine value | 20–50 | 25–34 |
| Titer, ° C | 40–45 | 40–43 |

U.S.A. WOOL GREASE FATTY ACIDS RECOVERED AS A BY-PRODUCT OF LANOLIN ALCOHOLS AND CHOLESTEROL MANUFACTURE

Acid number_____ 105–125
Saponification number_____ 140–165
Iodine number (Hanus)_____ 10–20
Titer, ° C_____ 50–53
Acetyl number_____ 45–75
Water, percent_____ 1–3
Ash, percent_____ 0.2–0.6

A third component of the new compositions comprises an alkanolamine phosphate, wherein the alkanolamine is of the character already described. Again, it is to be understood that comparable quantities of the corresponding alkanolamine or alkanolamines and phosphoric acid can be used in place of the alkanolamine phosphate or phosphates.

A rust or corrosion inhibitor is also present in the new compositions. Preferred as such an inhibitor is sodium nitrite. Although this is preferred, other related water-soluble salts can also be used as a partial or complete replacement. Such other salts include sodium carbonate, potassium nitrite and lithium nitrite.

A germicide is also present in the new compositions. These include phenol, the sodium salt of orthophenylphenol, the sodium salt of 2,3,4,6 tetrachlorophenol and methyl p-hydroxy benzoate (melting point, 124–128° C.), These materials provide germicidal action and odor improvement. One or more of these compounds can be used herein. A particularly effective combination of the same is one of phenol and methyl p-hydroxy benzoate.

Balanced proportions of the several components described above, must be used in order that the compositions have the desired combination of properties. If proportions of components outside of the limits indicated hereinbelow are used, the compositions will not possess many of the desired properties. For instance, too little of the olefin oxide reaction product will lower machining efficiency; too much of this component upsets relationships with other components. Too much soap causes excess foaming. The stability of the composition in hard water will depend upon the proper proportion of the alkanolamine phosphate present. An excess of phosphate together with an excess of rust inhibitor, such as sodium nitrite, results in instability of the composition with separation of some of the components. In addition, if less than the specified quantity of a germicide, such as the benzoate, is used, the composition fails to have the required germicidal properties and also develops objectionable odors during storage and service. If too great a quantity of rust inhibitor (e.g. sodium nitrite) and germicide (e.g. methyl p-hydroxy benzoate) is used, some solid residue will form on the machine tool being used; this residue can cause sticking of moving machine parts. Such residues are removed with difficulty.

The compositions of this invention are comprised of the following balanced proportions, which are expressed in weight percent.

|  | Broad range | Preferred |
|---|---|---|
| Alkylene oxide-aqueous polyol reaction product | 15–20 | 16.2 |
| Alkanolamine fatty acid soap | 1.5–5.2 | 2.9 |
| Alkanolamine phosphate | 11.0–22.0 | 16.6 |
| Rust inhibitor | 2–4 | 2.1 |
| Germicide | 1.15–3.25 | 2.2 |
| Water | Balance | 60.0 |
|  | 100 | 100 |

As indicated above, the compositions can be compounded from the individual alkanolamine, fatty acid and phosphoric acid, together with the other components. Preferred compositions so compounded can be expressed in the following manner, all figures being in weight percent:

|  | Broad range | Preferred (composition I) |
|---|---|---|
| Ethylene oxide-aqueous sorbitol reaction product (reaction product A) | 15–20 | 16.2 |
| Triethanolamine | 15–20 | 14.6 |
| Castor oil fatty acids | 1–3 | 1.7 |
| Phosphoric acid, 85% | 2–4 | 2.9 |
| Sodium nitrite | 2–4 | 2.1 |
| Phenol | 0.15–0.25 | 0.2 |
| Methyl p-hydroxy benzoate | 1–3 | 2.0 |
| Water | Balance | 60.3 |
|  | 100 | 100 |

The compositions contemplated herein are compounded according to the following procedure, which is illustrated by a preferred composition (identified herein as Composition I). The water used is charged to a steam-jacketed kettle, equipped with an agitator which is in operation throughout the preparation. Water is heated to 110–120° F. Reaction Product A, triethanolamine, castor oil fatty acids and phosphoric acid, in the order given, are added to the water. Agitation is continued at 110–120° F. until a clear solution is formed. Sodium nitrite, phenol and methyl p-hydroxy benzoate are added to the clear solution. Agitation is continued until a homogeneous product is obtained.

Composition I, prepared by the foregoing procedure, has the following characteristics:

| | |
|---|---|
| Color | Light amber (clear). |
| Odor | Neutral. |
| Specific gravity at 60/60° F | 1.1. |
| Reaction | Neutral. |
| pH 1–15 distilled water | 7.6. |
| Pour point, °F | +20. |
| Dispersions: | |
| 1–15 distilled water | Clear, bright amber. |
| 1–15 hard water (200 p.p.m.) | Hazy. |
| 1–15 hard water (500 p.p.m.) | Cloudy. |

When the compositions of this invention are used as coolants and lubricants for metal working, they are preferably used in diluted form. Recommended proportions are the following:

| Operation | Dilution |
|---|---|
| Tapping | 1–10 to 1–20. |
| Drilling | 1–15 to 1–30. |
| Grinding | 1–50 to 1–70. |

The compositions of this invention have been proven to be advantageous in a number of respects, as is demonstrated by the following test data.

*Almen pin test*

Composition I, diluted 1–10 with distilled water, withstood an "OK load" of more than 30,000 pounds per square inch. This test is described in Proc. A.P.I., 1932, pages 118–130.

*Tapping efficiency*

In the measurement of tapping efficiency of an oil, a series of holes is accurately drilled in a test metal, namely, SAE 1020 hot rolled steel. These holes are subsequently tapped with a series of taps in a drill press equipped with a table, which is free to rotate about the center, being mounted on ball bearings. A torque arm is attached to this "floating" table and this arm, in turn, actuates a spring scale so that the actual torque during tapping with the oil being evaluated is measured directly. The same taps used in evaluating the test oil are employed in tapping with a standard reference oil, which has arbitrarily been assigned an efficiency of 100 percent. The average torque for the test oil is compared to that of the standard and a relative efficiency is calculated on a percentage basis. For example, Torque with standard reference oil _____ 19.3
Torque with test oil _____ 19.8

$$\text{Relative efficiency of test oil} = \frac{19.3}{19.8} \times 100 = 97.4\%.$$

Standard, Socony Mobil "Solvac 410" diluted 1–15 with tap water = 100%.
Composition I diluted 1–15 with distilled water = 98%.

*Corrosion test*

Composition I is shown to be non-corrosive to ferrous products, by a humidity cabinet test on turnings of malleable iron treated with various dilutions thereof.

| Dilution | 90% relative humidity, 70° F., 72 hours |
|---|---|
| 1–15 distilled water | No corrosion. |
| 1–30 distilled water | Do. |
| 1–45 distilled water | Trace. |

Composition I was also subject to the following foam test wherein it was found that the composition was satisfactory. In this test, both the amount of foam produced and the rate of settling of the foam is indicative of whether the product will perform satisfactorily in service. The test is conducted by circulating a 1 to 50 dilution of the product thru a Viking pump. The rate of circulation is approximately 1 gallon per minute. 250 mls. of the 1–50 dilution is placed in a tall 1 liter graduate. The intake line to the pump is about ⅛ inch from the bottom of the cylinder. The return line is about 8 inches above the level of the liquid. Circulation is started and readings are taken at 5, 10 and 15 minutes to note foam formation. Circulation is stopped and readings taken at 5, 10 and 15 minutes to record settling of the foam. An excellent product will give from 300 to 400 mls. of foam which will completely settle in 5 minutes. Composition I exhibited 600 mls. of foam which settled in approximately 2 minutes.

Composition I was also found to be free from irritation to the nose and throat of members of a test panel. When Composition I was diluted with distilled water (1–50) and atomized before the panel, no irritation was experienced.

In a gum test it was found that Composition I formed a soft residual film on a metal surface, which film is removed readily with water. This test consists of evaporating 15 mls. of a 1–5 dilution on a 6 inch watch crystal in a forced draft oven at 160° F. for 48 hours.

Composition I was tested in the field using metals ranging from aluminum and cold-rolled to stainless and other alloy steels. In most cases the performance was superior to other products of this type in operations ranging from turning to grinding.

To further illustrate the outstanding character of Composition I, comparative test results are given of the same and related compositions. These are presented in the following tabulation, wherein all proportions are in weight percent.

|  | I | II | III |
|---|---|---|---|
| Composition: |  |  |  |
| Reaction product A | 16.2 | 16.7 | 14.7 |
| Triethanolamine | 14.6 | 13.8 | 12.8 |
| Castor oil fatty acids | 1.7 |  | 1.2 |
| Phosphoric acid, 85% | 2.9 | 3 | 2.6 |
| Sodium nitrite | 2.1 | 2.2 | 1.8 |
| Phenol | 0.2 |  |  |
| Methyl p-hydroxy benzoate | 2.0 |  |  |
| Water | 60.3 | 64.3 | 66.9 |
|  | 100 | 100 | 100 |
| Test results: |  |  |  |
| Almen pin test, p.s.i. | 30,000 | 8,000 | 24,000 |
| Tapping efficiency, percent | 98 | 80 | 87 |

It is to be noted from the foregoing tabulation that Composition I is markedly superior to Compositions II and III in machining efficiency. Further, Compositions II and III—unlike I—develop unpleasant odors during use or on storage, in view of the absence therefrom of a germicide.

I claim:

1. An aqueous coolant and lubricant composition consisting essentially of the following components:

| | Weight percent |
|---|---|
| A reaction product obtained by reacting a solution of a saturated polyol and water with an olefin oxide, said polyol containing at least three hydroxyl groups, from three to six carbon atoms per molecule, and only carbon, hydrogen and oxygen, said water being present in the proportion of from 0.08 to 1.5 mols per mol of hydroxyl radical in said polyol, said olefin oxide being selected from the group consisting of ethylene oxide, propylene oxide and mixed ethylene and propylene oxides and being employed in a molal quantity of at least 0.4 times the total molal quantity of hydroxyl in the polyol plus water and at least 1.5 times the the molal quantity of water, and said reaction being conducted between about 80° C. and about 140° C. in the presence of an etherification catalyst | 15–20 |
| An alkanolamine fatty acid soap, the alkanolamine of which is selected from the group consisting of diethanolamine and triethanolamine and the acid of which is selected from the group consisting of castor oil fatty acids, ricinoleic acid, wool grease fatty acids and oleic acid | 1.5–5.2 |
| An alkanolamine phosphate, the alkanolamine of which is selected from the group consisting of diethanolamine and triethanolamine | 11–22 |
| A rust inhibitor selected from the group consisting of sodium, potassium and lithium nitrite and sodium carbonate | 2–4 |
| A germicide selected from the group consisting of phenol, the sodium salt of orthophenylphenol, the sodium salt of tetrachlorophenol, and methyl p-hydroxy benzoate | 1.15–3.25 | and the balance water.

2. The composition of claim 1 wherein the reaction product is formed by reacting about five parts by weight of ethylene oxide with one part by weight of 85 percent aqueous sorbitol solution under alkaline conditions and at a temperature between about 80° C. and about 140° C.

3. The composition of claim 1 wherein the alkanolamine soap comprises triethanolamine soaps of castor oil fatty acids.

4. The composition of claim 1 wherein the alkanolamine phosphate is triethanolamine phosphate.

5. The composition of claim 1 wherein the rust inhibitor is sodium nitrite.

6. The composition of claim 1 wherein the germicide is a mixture of one part of phenol and about ten parts of methyl p-hydroxy benzoate.

7. An aqueous coolant and lubricant composition consisting essentially of:

| | Weight percent |
|---|---|
| A reaction product obtained by reacting a solution of a saturated polyol and water with an olefin oxide, said polyol containing at least three hydroxyl groups, from three to six carbon atoms per molecule, and only carbon, hydrogen and oxygen, said water being present in the proportion of from 0.08 to 1.5 mols per mol of hydroxyl radical in said polyol, said olefin oxide being selected from the group consisting of ethylene oxide, propylene oxide and mixed ethylene and propylene oxides and being employed in a molal quantity of at least 0.4 times the total molal quantity of hydroxyl in the polyol plus water and at least 1.5 times the molal quantity of water, and said reaction being conducted between about 80° C. and about 140° C. in the presence of an etherification catalyst | 15–20 |
| A low molecular weight alkanolamine selected from the group consisting of diethanolamine and triethanolamine | 15–20 |
| A fatty acid selected from the group consisting of castor oil fatty acids, ricinoleic acid, wool grease fatty acids and oleic acid | 1–3 |
| Phosphoric acid (85%) | 2–4 |
| A rust inhibitor selected from the group consisting of sodium, potassium and lithium nitrites and sodium carbonate | 2–4 |
| A germicide selected from the group consisting of phenol, the sodium salt of orthophenylphenol, the sodium salt of tetrachlorophenol, and methyl p-hydroxy benzoate | 1.15–3.25 | and the balance water,

8. The composition of claim 7 wherein the reaction product is formed by reacting about five parts by weight of ethylene oxide with one part by weight of 85 percent aqueous sorbitol solution under alkaline conditions and at a temperature between about 80° C. and about 140° C.

9. The composition of claim 7 wherein the germicide is a mixture of one part of phenol and about ten parts of methyl p-hydroxy benzoate.

10. An aqueous coolant and lubricant composition consisting essentially of:

| | Weight percent |
|---|---|
| A reaction product formed by reacting about five parts by weight of ethylene oxide with one part by weight of 85 percent aqueous sorbitol solution under alkaline conditions and at a temperature between about 80° C. and about 140° C. | 16.2 |
| Triethanolamine | 14.6 |
| Castor oil fatty acids | 1.7 |
| Phosphoric acid (85%) | 2.9 |
| Sodium nitrite | 2.1 |
| Phenol | 0.2 |
| Methyl p-hydroxy benzoate | 2.0 |
| And water | 60.3 |

11. An aqueous emulsion-form coolant and lubricant composition of matter consisting essentially of:

| | Weight percent |
|---|---|
| Ethylene oxide-aqueous sorbitol reaction product formed by reacting about five parts by weight of ethylene oxide with one part by weight of 85 percent aqueous sorbitol solution under alkaline conditions and at a temperature between about 80° C. and about 140° C., said sorbitol containing at least three hydroxyl groups | 15–20 |
| Triethanolamine soaps of castor oil fatty acids | 1.5–5.2 |
| Triethanolamine phosphate | 11.0–22.0 |
| Corrosion inhibitor selected from the group consisting of sodium nitrite, sodium carboate, potassium nitrite and lithium nitrite | 2.0–4.0 |
| Germicide selected from the group consisting of phenol, the sodium salt of orthophenylphenol, the sodium salt of 2,3,4,6-tetrachlorophenol and methyl p-hydroxy benzoate | 1.15–3.25 |
| Water | To balance |
| | 100.0 |

References Cited in the file of this patent

UNITED STATES PATENTS

| 1,879,351 | Lehmann | Sept. 27, 1932 |
| 1,959,930 | Schmidt et al. | May 22, 1934 |
| 2,450,079 | Brown | Sept. 28, 1948 |
| 2,625,509 | Laug | Jan. 13, 1953 |
| 2,825,693 | Beaubien et al. | Mar. 4, 1958 |